US012780271B2

(12) United States Patent
Linsdall et al.

(10) Patent No.: US 12,780,271 B2
(45) Date of Patent: Nov. 3, 2026

(54) FIBER OPTIC SENSOR UNIT, OPTICAL MEASURING SYSTEM, AND AXLE-COUNTING DEVICE AND METHOD

(71) Applicant: Thales Management & Services Deutschland GmbH, Ditzingen (DE)

(72) Inventors: David Linsdall, Burnham (GB); Rainer Klemm, Steinheim (DE); Scarlett Foeller, Koenigsbach-Stein (DE); Matthias Heyder, Weimar (DE); Petar Naumovski, Stuttgart (DE)

(73) Assignee: Thales Management & Services Deutschland GmbH, Ditzingen (DE)

( * ) Notice: Subject to any disclaimer, the term of this patent is extended or adjusted under 35 U.S.C. 154(b) by 0 days.

(21) Appl. No.: 17/447,267

(22) Filed: Sep. 9, 2021

(65) Prior Publication Data

US 2021/0403059 A1 Dec. 30, 2021

Related U.S. Application Data

(63) Continuation of application No. PCT/EP2020/056493, filed on Mar. 11, 2020.

(30) Foreign Application Priority Data

Mar. 14, 2019 (EP) .................................... 19162729

(51) Int. Cl.
*G01L 1/24* (2006.01)
*B61K 9/08* (2006.01)
*G01M 5/00* (2006.01)

(52) U.S. Cl.
CPC ................ *B61K 9/08* (2013.01); *G01L 1/246* (2013.01); *G01M 5/0025* (2013.01); *G01M 5/0091* (2013.01)

(58) Field of Classification Search
None
See application file for complete search history.

(56) References Cited

U.S. PATENT DOCUMENTS 5,394,488 A * 2/1995 Fernald .................. G01H 9/004 385/13
6,246,048 B1 * 6/2001 Ramos .................... G01L 1/246 250/227.21

(Continued)

FOREIGN PATENT DOCUMENTS

DE 10 2008 014644 A1 10/2009
DE 10 2014 100 653 A1 7/2015

(Continued)

OTHER PUBLICATIONS

Espacenet, machine translation, Linnert et al., "Drive shaft for propeller gondola, has sensor designed as fiber optic cable with bragg-grating-sensors . . . " Oct. 1, 2009 (Year: 2009).*

(Continued)

*Primary Examiner* — Arleen M Vazquez
*Assistant Examiner* — Denise R Karavias
(74) *Attorney, Agent, or Firm* — Orbit IP, LLP; Marc G. Martino

(57) ABSTRACT

A fiber optic sensor unit for detecting a mechanical force acting on a rail includes at least a first sensor fiber, a first elongated fiber optic strain sensor and a second elongated fiber optic strain sensor. The first sensor fiber includes the first strain sensor and is characterized in that the at least one sensor fiber is attached to a sensor plate. The first fiber strain sensor and the second strain sensor are arranged in an x-type or v-type geometry, wherein the first strain sensor and the second strain sensor are arranged in an angle of 60° to 120°, in particular of 90°, to each other. Measurements with (Continued)

increased amplification of the measurement signal and improved raw data can be made.

20 Claims, 9 Drawing Sheets

(56) References Cited

U.S. PATENT DOCUMENTS

| | | | | |
|---|---|---|---|---|
| 7,680,363 | B2 | 3/2010 | Wakahara et al. | |
| 2002/0028034 | A1* | 3/2002 | Chen | G02B 6/4215 385/12 |
| 2002/0092976 | A1 | 7/2002 | Sugai | |
| 2006/0045408 | A1 | 3/2006 | Jones et al. | |
| 2006/0202860 | A1* | 9/2006 | Tsai | B61L 1/18 340/870.28 |
| 2010/0272384 | A1 | 10/2010 | Mueller et al. | |
| 2011/0051123 | A1* | 3/2011 | Kunigami | G01L 5/166 702/42 |
| 2012/0176597 | A1* | 7/2012 | Asokan | G01K 11/3206 385/12 |
| 2013/0139606 | A1* | 6/2013 | Swinehart | G01L 1/246 73/800 |
| 2014/0321799 | A1* | 10/2014 | Udd | G02B 6/022 385/13 |
| 2015/0131100 | A1* | 5/2015 | Reck | G01L 11/02 356/445 |
| 2016/0356661 | A1* | 12/2016 | Glueck | B61K 9/08 |
| 2017/0122826 | A1* | 5/2017 | Udd | G01D 5/35316 |
| 2017/0138805 | A1* | 5/2017 | Jiang | B61L 23/047 |
| 2018/0022367 | A1* | 1/2018 | Oldewurtel | B61L 1/166 246/122 R |
| 2018/0274909 | A1* | 9/2018 | Müller | G02B 6/3616 |

FOREIGN PATENT DOCUMENTS

| | | | | |
|---|---|---|---|---|
| EP | 3069952 | A1 | 9/2016 | |
| JP | H06-307953 | A | 11/1994 | |
| JP | 2001-296110 | A | 10/2001 | |
| JP | 2002-529728 | A | 9/2002 | |
| JP | 3648454 | B2 | 5/2005 | |
| JP | 2008-070357 | A | 3/2008 | |
| JP | 2008134155 | A * | 6/2008 | |
| JP | 2011-053145 | A | 3/2011 | |
| JP | 2017-504030 | A | 2/2017 | |
| JP | 2018-514432 | A | 6/2018 | |
| KR | 10-2012-0009729 | A | 2/2012 | |
| WO | 00/28294 | A1 | 5/2000 | |
| WO | 2000/028294 | A1 | 5/2000 | |
| WO | 03/076887 | A1 | 9/2003 | |
| WO | WO-03076887 | A2 * | 9/2003 | G01K 11/32 |

OTHER PUBLICATIONS

Omega: Positioning Strain Gages to Monitor Bending, Axial, Shear, and Torsional Loads; https://www.omega.com/faq/pressure/pdf/positioning.pdf.

* cited by examiner

FIBER OPTIC SENSOR UNIT, OPTICAL MEASURING SYSTEM, AND AXLE-COUNTING DEVICE AND METHOD

CROSS-REFERENCE TO RELATED APPLICATIONS

This continuation application claims priority to PCT/EP2020/056493 filed on Mar. 11, 2020 which has published as WO 2020/182876 A1 and also the European application number 19 162 729.8 filed on Mar. 14, 2019, the entire contents of which are fully incorporated herein with these references.

DESCRIPTION

Field of the Invention

The invention concerns a fiber optic sensor unit for detecting a mechanical force acting on a rail comprising: at least a first sensor fiber, a first elongated fiber optic strain sensor and a second elongated fiber optic strain sensor, wherein the first sensor fiber comprises the first strain sensor.

Background of the Invention

An according fiber optic sensor unit is known from [01].

Fiber Bragg grating sensors have been reported to be used for axle counter measurements in the recent past. Older conventional axle counter which use electromagnetic sensors for detecting the change in magnetic permittivity due to the flange of the wheel passing the sensor device are prone to the stray fields from electric traction motors and also require electronics boxes quite close to each sensor. A fiber optic sensor uses two or more fiber Bragg gratings to measure the shear strain experienced by a railway line when a train wheel passes over it. The measured strain can then be used to detect the passage of the wheel, its passing speed, the direction of travel and the load on the wheel. The primary use of the sensor is to determine whether a track block is occupied by counting the number of wheels that pass the sensor position. The use of fiber Bragg grating sensors allows a much smaller and more robust sensor to be placed on the track and the processing equipment to be located several kilometers away. This greatly reduces the installation and maintenance costs of the signaling system.

[02] discloses a rail measuring system for measuring a mechanical force acting on a rail using fiber-optic sensors using two single fiber Bragg gratings. One of the fiber Bragg gratings is attached to the rail at an angle of +45° relative to the neutral fiber, the other at an angle of −45° relative to the neutral fiber wherein the fiber Bragg gratings are spaced from each other in the direction of the rail. A disadvantage of the arrangement known from [02] is that the sensitivity is not sufficient to reliably detect each axle, so that the safety level (SIL4) required for trains is not guaranteed, since the signals resulting from the shear stress measurement are not suitable for threshold evaluation.

[01] discloses a fiber optic sensor unit for axle counting comprising a pair of FBG sensors mounted on a plate at 45° and parallel to each other. The FBG sensors are separated from each other along the rail direction. The signals from the two fibers are subtracted to give a detection pulse for each wheel. The concept assumes and requires that the bending, compression and vibrations experienced by the rail due to the passing of the preceding and following wheels of the train are coherent over the whole length of the fiber optic sensor unit. Subtracting the signals from the two fibers should result in a detection pulse, which is purely due to the change in shear strain as the wheel passes (See FIG. 1 below). Testings of the sensor have shown that the key assumption is not completely correct and that the two fibers experience different unwanted strains, which do not cancel out, thus resulting in distorted detection pulses and a high background noise level. The fiber optic sensor unit known from [01] produces unreliable counts when fast, varied load trains pass over. This is in particular a problem when axles of freight trains are to be counted since the load on the rail varies considerably due to the large difference in weight between a loaded and an unloaded wagon. The disturbances acting on the rail are larger by orders of magnitude than the signal to be measured (shear stresses). As a result, axes are not counted correctly or not counted at all, which must be avoided at all costs.

[03] Suggests a dual X style placement in FIG. E in the context of a 4-sensor bridge arrangement.

SUMMARY OF THE INVENTION

Object of the Invention

It is an object of the invention to provide a fiber optic sensor, which allows measurements with increased amplification of the measurement signal and improved raw data.

DESCRIPTION OF THE INVENTION

This object is achieved by a fiber optic sensor unit, an optical measuring system, an axle-counting device and an axle-counting method according to the claims.

According to the invention the at least one sensor fiber is attached to a sensor plate, and the first fiber strain sensor and the second strain sensor are arranged in an x-type or v-type geometry, wherein the first strain sensor and the second strain sensor are arranged in an angle of 60° to 120°, in particular of 90°, to each other.

The detected optical signals in general comprise a signal to be detected (target signal), e.g. shear stress generated by a passing wheel of a train and undesired disturbances (interfering signal), e.g. due to the bending and vibrations of the rails or temperature.

According to the invention the strain sensors are not at a distance to each other, but are arranged overlapping (x-type geometry) or non-overlapping but adjacent to each other (v-type geometry). Thus, when attached to a rail, the two strain sensors detect a specific disturbance acting on the same or nearly the same position of the rail. This is in particular advantageous in case of disturbances, which may vary in time, since the time between measurement by the first strain sensor and the second strain sensor is minimized.

The inventive arrangement allows signal detection with improved signal quality. This is in particular important for usage of the optic fiber unit for detecting signals, which are low, which may vary considerably, or which are superimposed by disturbances with similar or higher amplitude, which e.g. is the case in axle counting within a rail system.

In a highly preferred embodiment the strain sensors are fiber Bragg gratings. Each fiber Bragg grating has a Bragg wavelength that depends on the mechanical strain, which acts on the fiber Bragg grating. Either both fiber Bragg gratings are inscribed in one sensor fiber (i.e. the sensor fiber comprises two FBG-segments) or each of the FBGs is inscribed in a separate sensor fiber (i.e. each fiber comprises one FBG-segment).

According to a preferred embodiment of the inventive fiber optic sensor unit the sensor plate comprises a gap (recess), wherein the at least one fiber spans the gap such that the strain sensors are positioned within the gap. The gap in the sensor plate allows the FBGs to be positioned freely (i.e. without contact to the sensor plate). The strain sensors, which span the gap, are preloaded.

In a highly preferred embodiment, the first strain sensor and the second strain sensor are arranged in an x-type geometry, and the strain sensors are at a distance to each other in a direction perpendicular to the longitudinal extensions of the strain sensors. I.e. the strain sensors are arranged in an x-type geometry without touching each other (due to the distance between the FBGs in a direction perpendicular to the longitudinal extensions of the strain sensors). The first strain sensor and the second strain sensor extend along skew lines. The angle between the two strain sensors is the angel of the projection along the common plumb line of the two strain sensors. “x-type geometry” means, that the projections of the strain sensors along the common plumb line intersect (i.e. the strain sensors overlap with respect of the longitudinal extension of the rail. Preferably, the x-type geometry has a two-fold rotational symmetry, in particular a 4-fold rotational symmetry, i.e. the centers of both strain sensors are arranged on the common plumb line.

Alternatively, the strain sensors can be arranged in a v-type geometry. In this case, the two strain sensors react a little delayed. I.e. the processed sensor signal becomes temporally wider and possibly somewhat lower in the maximum amplitude. The transverse forces may be not be exactly the same. I.e. the suppression of disturbances is somewhat less effective compared to the x-geometry. Yet, the v-type geometry is easier and cheaper to produce, since the strain sensors can be positioned at the same height level.

The sensor plate may comprise at least one groove in which the at least one sensor fiber is attached. By providing one or two grooves, the fibers can be easily positioned and fixed on the sensor plate. In addition, the fiber’s course can be determined by the grooves. By providing the at least one groove at different depth, the fibers can be positioned at a distance while crossing each other. Thus, in a special embodiment of the fiber optic sensor unit the grooves lead to a gap within the sensor plate from different directions but at different levels (i.e. the grooves have different depth), such that the fiber-segments cross each other at different levels, thereby allowing each other to cross without touching each other.

Preferably, two grooves are provided with different depth. Alternatively, the groove for one sensor may be on the top surface of the sensor plate with the groove for the other sensor on the bottom surface such that they do not touch. The fiber for the bottom sensor can be led from the top of the plate through a hole in the plate to the bottom surface. The fiber can be attached to a mechanical amplifier and transfer the deformation from the rail to the strain sensor. The mechanical amplifier which is part of/integrated in the sensor plate.

The at least one groove may be etched. Preferably, the grooves are produced by using an etching process, wherein for different grooves different etching depth are used. The etching process prepares the grooves perfectly for a gluing process for attaching the fiber to the sensor plate. Two different etching depths are preferably achieved by double etching, but it would also be possible to etch only once with different exposure time for the two grooves.

Preferably, the first groove and the second groove are part of the same sensor plate, wherein the two grooves are at different height levels of the sensor plate. This is in particular advantageous when using x-type geometry, since the fibers can be positioned at a distance while crossing each other. In case of a v-type geometry, the sensors can be positioned at the same depth-level. No different groove depth are required in this case.

In a special embodiment, the sensor fiber comprises both, the first fiber Bragg grating as well as the second fiber Bragg grating. I.e. both FBGs are inscribed in the same sensor fiber. Only one sensor fiber is required for the fiber optic sensor unit, which makes this embodiment of the inventive fiber optic sensor unit cost efficient and easy to manufacture. This embodiment allows easy temperature compensation since the working ranges, and therefore the reflected wavelengths, of both FBGs are shifted the same way in case of a change in temperature. No mechanical compensation means are required for temperature compensation. The embodiment with only one sensor fiber requires FBGs with different Bragg wavelengths.

In an alternative embodiment, the fiber optic sensor unit comprises two sensor fibers, each fiber Bragg grating being part of a separate sensor fiber. By using different sensor fibers, each of which having one FBG, FBGs with the same Bragg wavelength can be used.

Preferably, both fibers are mounted on the same sensor plate. In this case, the relative arrangement of FBGs is fixed, thereby allowing an easy mounting of the fiber sensor unit.

The sensor plate can be attached to a base plate for mounting the fiber optic sensor on the rail, wherein the base plate has a continuous bottom plane. Since the sensor plate has gaps in the area where the FBGs are located, the sensor plate itself cannot be glued over a continuous area. By providing an additional base plate, a large and continuous gluing area can be provided.

In order to allow the detection of light wheel loads, it is preferred that the sensor plate includes a mechanical amplifier, which transfers and multiplies the alternation of length from the rail to the fiber Bragg grating. An according amplifier has been described in [01]. In contrast to [01] no temperature compensation is required with the invention x-type geometry.

The invention also concerns an optical measuring system for measuring shear stress of a rail, the system comprising: the rail having a longitudinal extension and a neutral axis which extends along the longitudinal extension, a fiber optic sensor unit as described above for detecting optical signals in dependence of the shear strain acting on the rail, wherein the fiber optic sensor unit is mounted at the rail such that the fiber Bragg gratings are oriented obliquely with respect to the neutral axis, a light source which is adapted for coupling light into the sensor fibers of the fiber optic sensor unit, and a signal processing unit for processing signals detected by the fiber optic sensor unit.

In a highly preferred embodiment the fiber optic sensor unit is mounted at the rail such that the strain sensors are oriented at an angle of 30°-60° with respect to the neutral axis, preferably at an angel of 45° with respect to the neutral axis.

The light sources couples light into the at least one sensor fiber. The light is guided to the first and the second FBG, wherein each FBG has a reflection spectrum having a reflection peak, which is at a Bragg wavelength and has a full width at half maximum. The light reflected by two fiber Bragg gratings is detected and processed within the signal-processing unit, as a result of which a shear stress signal of the rail is received.

A passing wheel of a train generates an optical signal in the fiber Bragg gratings, which is a wavelength change. Due to the x-type or v-type arrangement of the two fiber Bragg gratings the wavelength reflected by one of the fiber Bragg gratings in the first instance decreases during the approach of a wheel and the reflected wavelength of the other fiber Bragg grating increases at the same time. Further, while the wheel is passing the sensor and while moving away from it, the reflected wavelength of both fiber Bragg gratings behave the opposite way. In contrast to that, disturbances which are in transverse direction of the rail E.g. caused by the sinusoidal movement of the train axles or caused by temperature, change the wavelength of both fiber Bragg gratings in the same direction. This effect enables the post signal processing to eliminate or at least substantially reduce interfering signals by subtracting both detected signals (signal detected by the first fiber Bragg grating and signal detected by the second fiber Bragg grating) after the wavelength changes got converted in a light intensity change. Optical filters preferably do this conversion.

Preferably, the fiber optic sensor unit is attached to the rail at the rail web.

In a special embodiment, the signal-processing unit comprises an edge filter with a falling edge and a raising edge and that the first fiber Bragg grating has a Bragg wavelength at the raising edge and the second fiber Bragg grating has a Bragg wavelength at the falling edge of the edge filter. This is in particular useful if the two fiber Bragg gratings have different Bragg wavelength. The initial wavelengths (Bragg wavelength without extra load being applied) of the fiber Bragg gratings and the edge filter are chosen such that the initial wavelengths of the fiber Bragg gratings are on different edges of the edge filter. Thus, the edge filter with edges at the Bragg wavelengths of the fiber Bragg gratings converts a change of wavelength of the reflected light into a light-intensity change. This allows the signals from the two sensors to be subtracted within the edge filter mechanism, canceling out the unwanted disturbances resulting in the pure measurement of the shear strain in the rail.

In a highly preferred embodiment, the strain sensors are arranged symmetrically to a plane comprising the neutral axis of the rail. I.e. the sensor has a perfect x-type geometry. The symmetry plane of the x-type strain sensor is perpendicular to the symmetry plane of the rail. This ensures that both strain sensors experience forces acting on the same rail segment, thereby optimizing the filtering of disturbances from the optical signals.

The symmetry of an x-type geometry to the horizontal neutral axis results in that forces acting perpendicular from the top to the center of the X produce no signal. This is the case with each of the two FBGs at exactly the same position (perfect x-type geometry).

It is also preferred that the strain sensors are arranged symmetrically to a plane perpendicular to the neutral axis of the rail. The geometry to a plane perpendicular to the neutral axis ensures that the angels of the two strain sensors to the neutral axis are equal in amount.

The invention also concerns an axle-counting device comprising at least one light source and at least one counting unit, wherein each counting unit comprises at least one fiber optic sensor unit as described above which is adapted for mounting to a rail and a signal-processing unit, wherein the light source is adapted for coupling light into the sensor fibers of the fiber optic sensor unit.

The invention further concerns an axle-counting method for rail bound vehicles, comprising the following method steps: coupling, via at least one sensor fiber, light into a first and a second fiber optic strain sensor of a fiber optic sensor unit which is attached to a rail, detecting light reflected by the first and the second fiber optic strain sensor, as a result of which a shear stress signal of the rail is received in each case, wherein each fiber optic strain sensor has a reflection spectrum having a reflection peak which is at a Bragg wavelength and has a full width at half maximum, generating a shear stress difference signal from the two received shear stress signals; and generating a wheel signal within a signal-processing unit if the shear stress difference signal exceeds a predetermined upper limiting value or falls below a predetermined lower limiting value. According to the invention, the fiber optic strain sensors are arranged in an x-type or v-type geometry, wherein the first strain sensor and the second strain sensor are arranged in an angle of 60° to 120°, in particular of 90°, to each other, and wherein the full width at half maximum of the a reflection peaks of the first fiber optic strain sensor and the second fiber optic strain sensor deviate from each other by a maximum of 200%.

With the method known from [1], the full widths at half maximum of the first reflection peak is many times larger than the full width at half maximum of the second reflection peak. When the rail is loaded, the wavelengths of the two FBGs move in the same direction, but with a time delay, so that the two FBG signals overlap temporarily, which is supported by providing the different full widths at half maximum. Yet, if the first reflection peak is about 4 times as wide as suggested in the current patent, then the received light power will be reduced by a maximum of ⅕ by a wheel crossing. Interference signals, e.g. caused by lateral forces, affect both FBG signals and add up. The signal-to-noise ratio is therefore very unfavorable. The downstream evaluation enables direction recognition, but is also sensitive to interference. Since also the wide pulse of first reflection peak is shifted by disturbances in the wavelength, this is however approx. 4 times as wide as the narrow pulse, the disturbances act on it with factor 4!

In contrast to the method known from [1] the inventive method uses FBGs with reflection peaks having a comparable full width at half maximum. The inventive X arrangement shifts the wavelengths of the two FBGs in the opposite direction. The distances between the operating points can be selected so that they "overtake" each other when a wheel passes over them. By providing two strain sensors with the same full width at half maximum, the received light is reduced in intensity in the ideal case with the crossing of a wheel twice by the half. The full width at half maximum of the reflection peaks is preferably chosen such that a predetermined range for wheel loads is achieved. The difference between the Bragg wavelengths of the two fiber strain sensors is preferably chosen such that a predetermined minimum sensitivity is achieved.

Each wheel produces either a positive pulse followed by a negative pulse or alternatively a negative pulse followed by a positive pulse depending on the direction of the train. The conversion of the wavelength change into light intensities takes place in the OEC (optical chip), which limits the required optical signal processing to a minimum (one photodiode) and also makes the electrical evaluation simple.

In a preferred variant of the inventive method, the sensor fiber comprises both, the first and the second fiber optic strain sensors, the first and the second fiber optic strain sensors being arranged in a row and having different Bragg wavelengths. The shear stress difference signal is generated optically by a spectral overlap of the reflection peaks of the two fiber optic strain sensors during the transition from an unloaded state to a loaded state.

In a special variant, the method steps a) to d) are carried out with a further fiber optic sensor unit, which is attached to another rail of the track wherein the two fiber optic sensor units are spaced apart from one another in the rail direction. The direction information is not included in this signal. In order to receive direction information a further fiber optic sensor unit is required, which in a distance to the first fiber optic sensor unit in the longitudinal direction of the track. Ideally, this should be mounted slightly offset on the other rail, because this increases the detection rate of axles in the event that the wheel of an axle on one side of the track does not transmit the required forces to the rail, e.g. through a flat spot.

Further advantages of the invention can be derived from the description and the drawing. The features mentioned above and those described below may be used individually for themselves or in any combination of them. The embodiments shown and described are not to be understood as an exhaustive list, but rather have exemplary character for the description of the invention.

DETAILED DESCRIPTION OF THE PREFERRED EMBODIMENTS

Figures 1A, 1B, 1C, 1D:
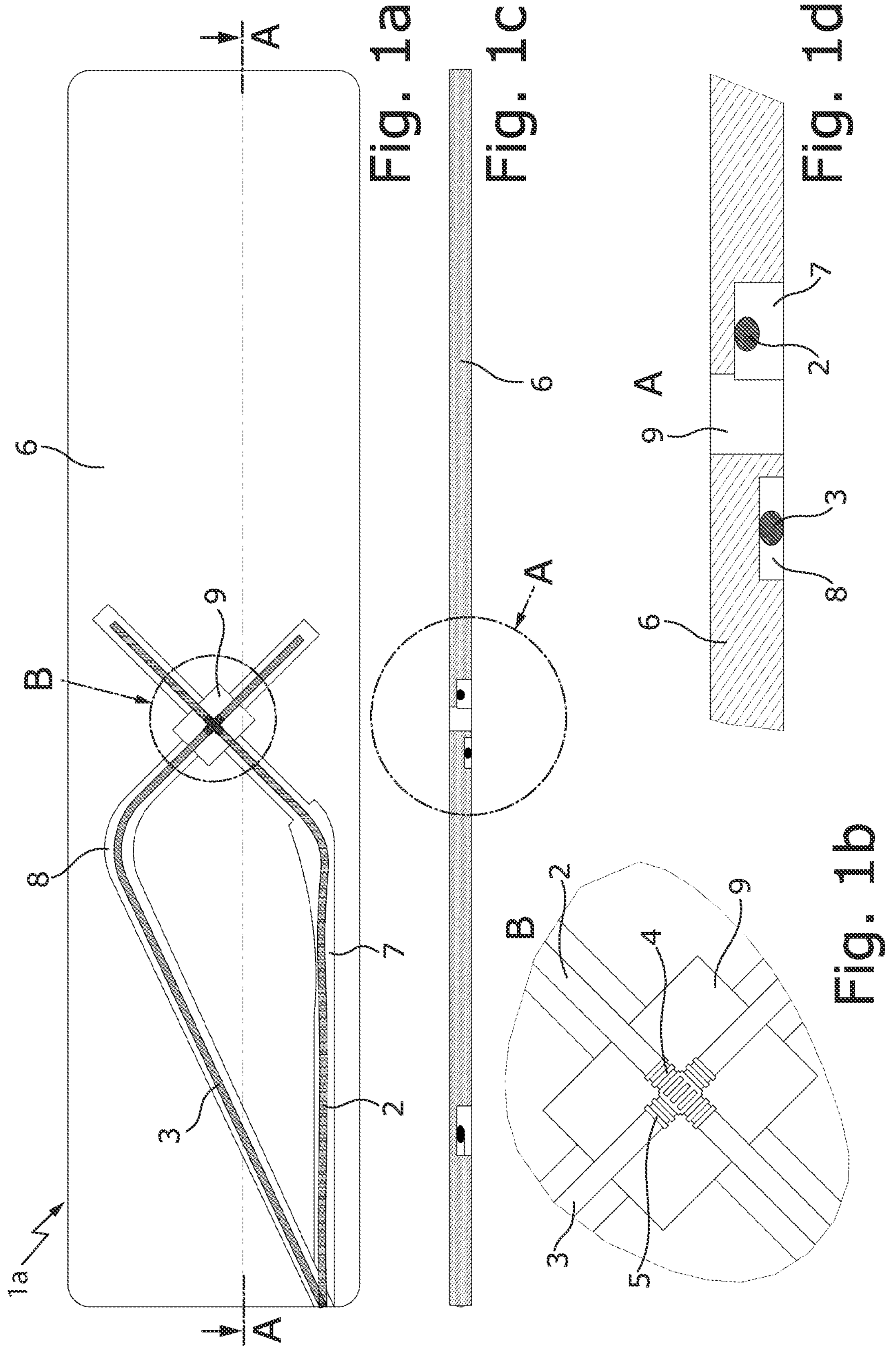
FIG. 1*a* shows a top view of a first embodiment of the inventive fiber optic sensor unit with two sensor fibers, each sensor fiber comprising a fiber Bragg grating (x-type geometry).
FIG. 1*b* shows an enlarged detail of area B of FIG. 1*a*.
FIG. 1*c* shows a cross sectional view along a longitudinal direction of the first embodiment of the inventive fiber optic sensor unit.
FIG. 1*d* shows an enlarged detail of area A of FIG. 1*a*.
Figure 1E:
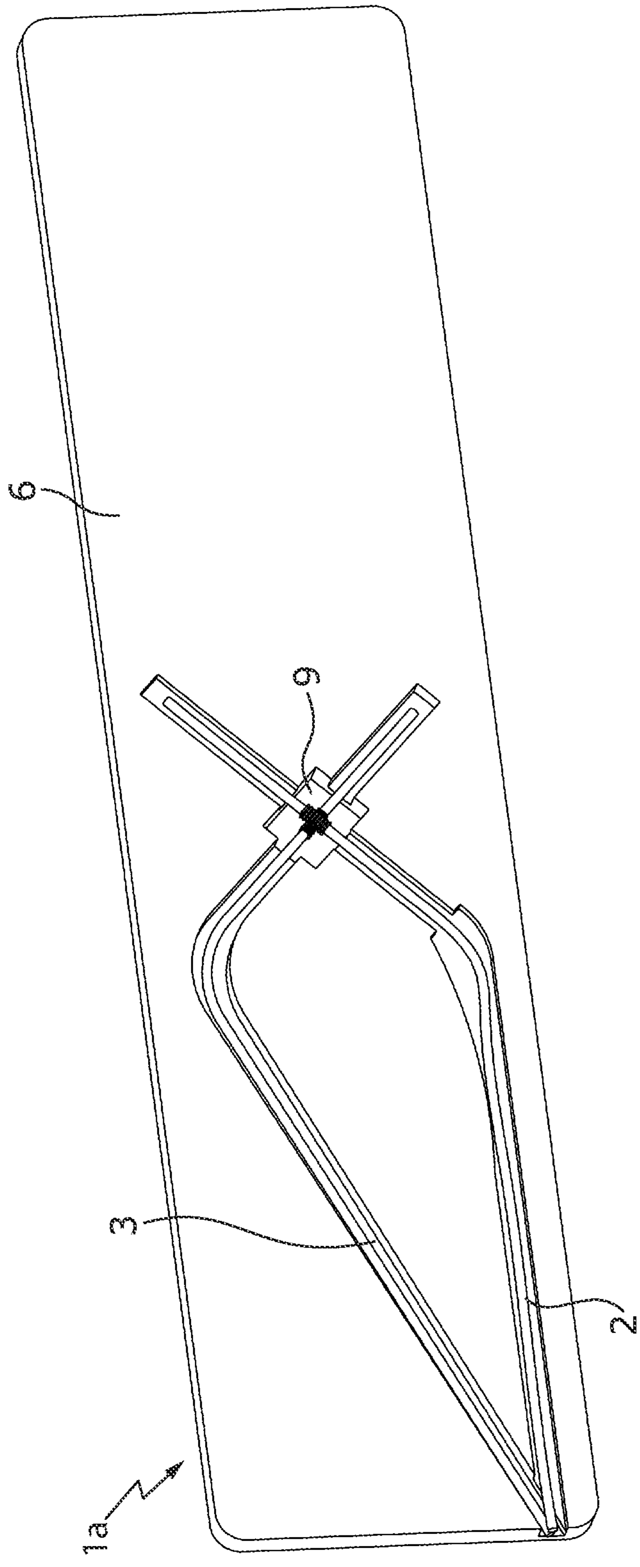
FIG. 1*e* shows a perspective view of the first embodiment of the inventive fiber optic sensor unit.

FIGS. 1*a-d* show different views of a first embodiment of the inventive fiber optic sensor unit 1*a*. The inventive fiber optic sensor unit 1*a* according to the first embodiment comprises a first sensor fiber 2 and a second sensor fiber 3, wherein the first sensor fiber 2 comprises a first fiber Bragg grating (FBG) 4 and a second FBG 5. The sensor fibers 2, 3 are attached to a sensor plate 6. The sensor plate 6 has grooves 7, 8 in which the sensor fibers 2, 3 run. The sensor plate has a gap 9. The sensor fibers 2, 3 span the gap 9 such that the FBGs 4, 5 cross each other in a crossing area B. The crossing area B is shown in more detail in FIG. 1*b*. The cross sectional view shown in FIG. 1*c* and the detailed view of section A shown in FIG. 1*d* show that the two sensor fibers 2, 3 run at different height levels in order to cross each other without touching each other. A perspective view of the first embodiment of the inventive fiber optic sensor unit is shown in FIG. 1*e*.

Figure 2A:
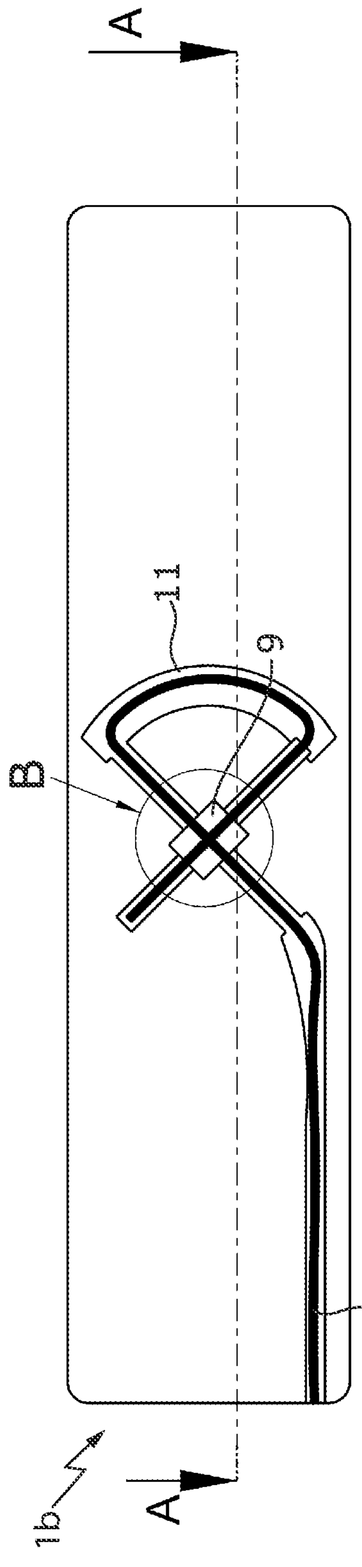
FIG. 2*a* shows a top view of a second embodiment of the inventive fiber optic sensor unit with one sensor fiber, the sensor fiber comprising two fiber Bragg gratings with different Bragg wavelength (x-type geometry).
Figure 2C:
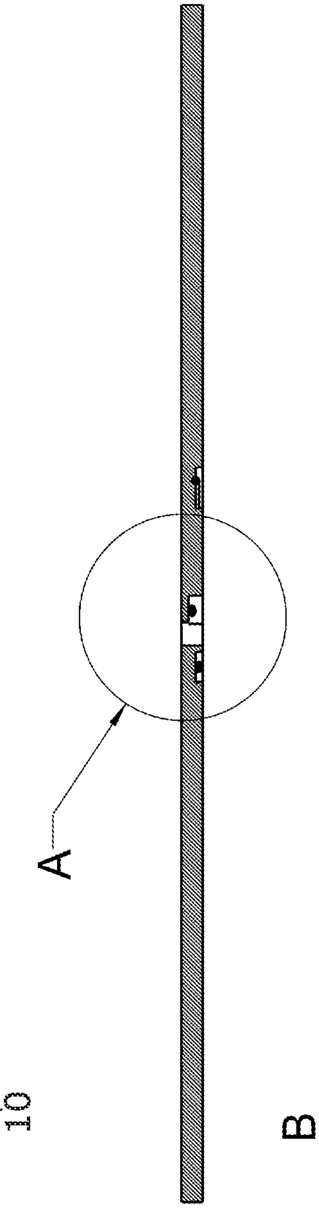
FIG. 2*c* shows a cross sectional view along a longitudinal direction of the second embodiment of the inventive fiber optic sensor unit.
Figure 2D:
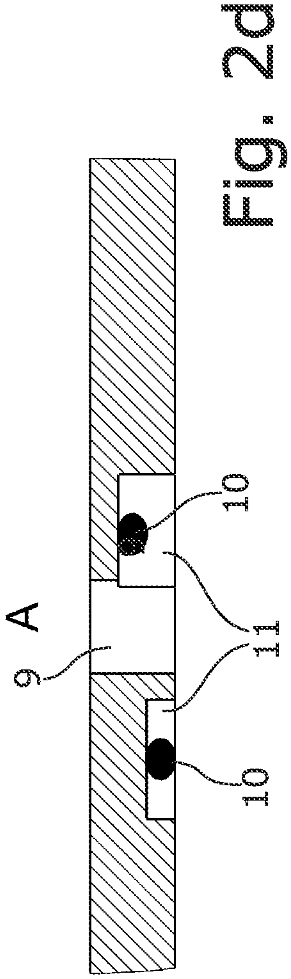
FIG. 2*d* shows an enlarged detail of area A of FIG. 2*a*.
Figure 2B:
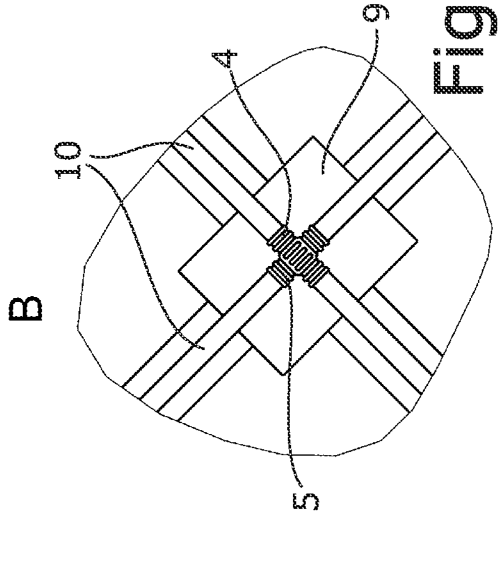
FIG. 2*b* shows an enlarged detail of area B of FIG. 2*a*.
Figure 2E:
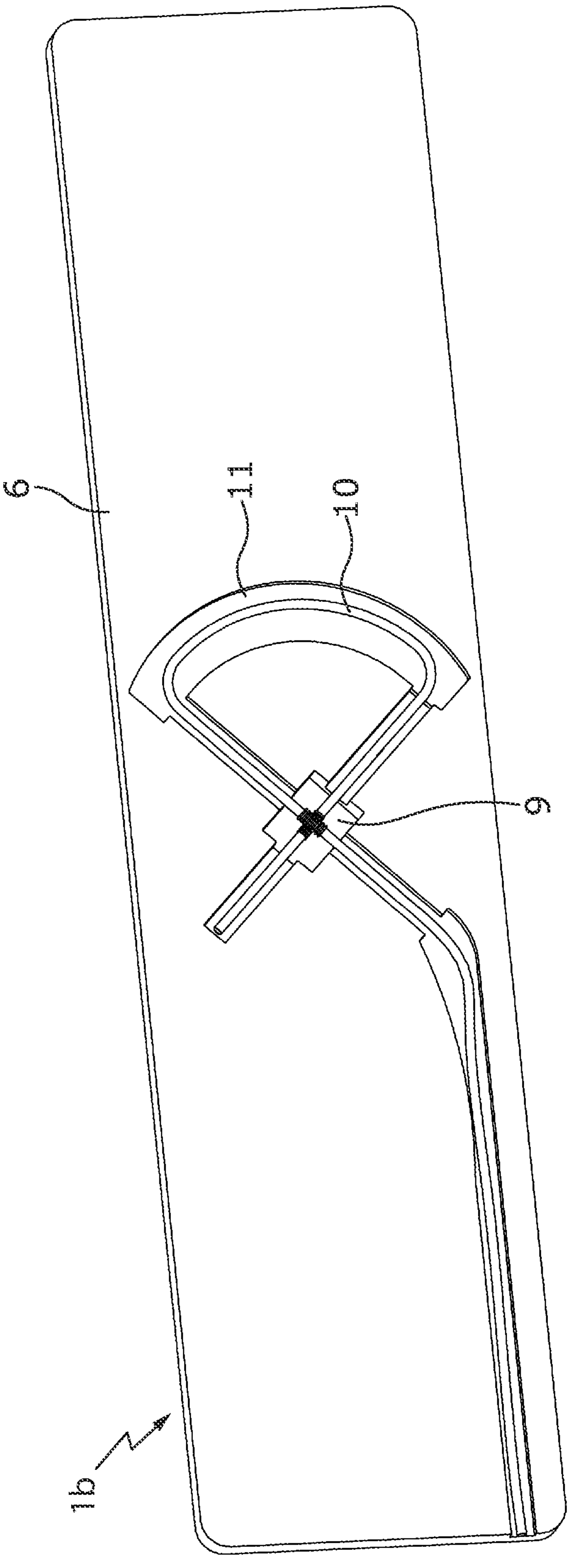
FIG. 2*e* shows a perspective view of the second embodiment of the inventive fiber optic sensor unit.

A second embodiment of the inventive fiber sensor unit 1*b* is shown in FIGS. 2*a-d*. The inventive fiber optic sensor unit 1*b* according to the second embodiment comprises only one sensor fiber 10, wherein the sensor fiber 10 comprises the first FBG 4 and the second FBG 5. In this embodiment, the FBGs have different Bragg wavelengths λ1, λ2. The sensor fiber 10 is attached to the sensor plate 6. The sensor fiber 10 runs in a groove 11 of the sensor plate 6. As in the first embodiment, the sensor plate 6 has a gap 9. The sensor fiber 10 span the gap 9 two times from different directions such that the FBGs 4, 5 cross each other in the crossing area B. The cross sectional view shown in FIG. 2*c* and the detailed view of section FIG. 2*d* shows that the sensor fiber 10 runs at different height levels at different positions of the sensor plate 6 in order to cross each other in the crossing area without touching each other. A perspective view of the second embodiment of the inventive fiber optic sensor unit is shown in FIG. 2*e*.

Both embodiments show a cross-type geometry of the FBGs, wherein the FBGs are arranged in an angle 90° to each other.

Figure 3A:
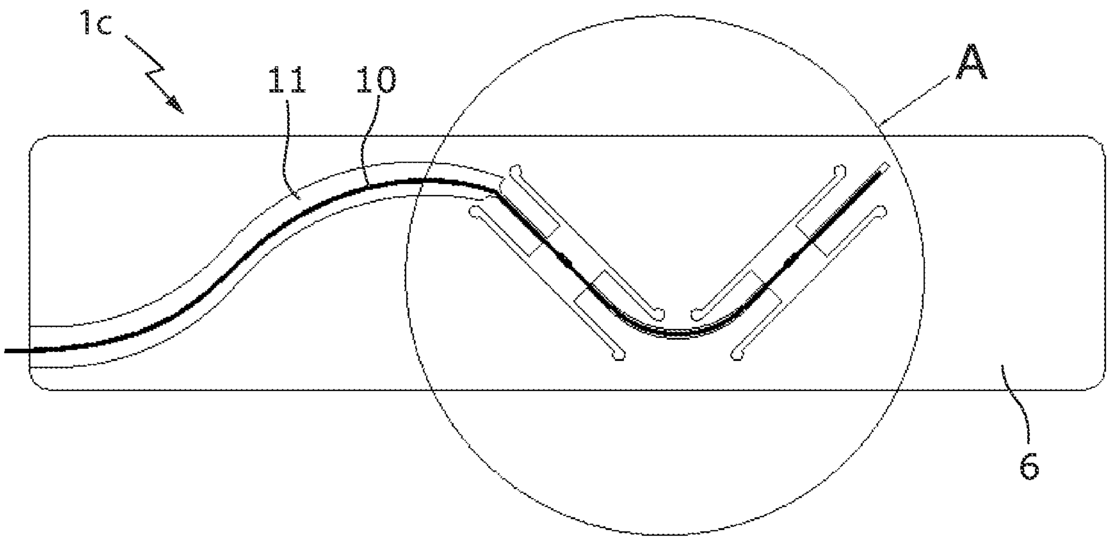
FIG. 3*a* shows a third embodiment of the inventive fiber optic sensor with a v-type geometry.
Figure 3B:
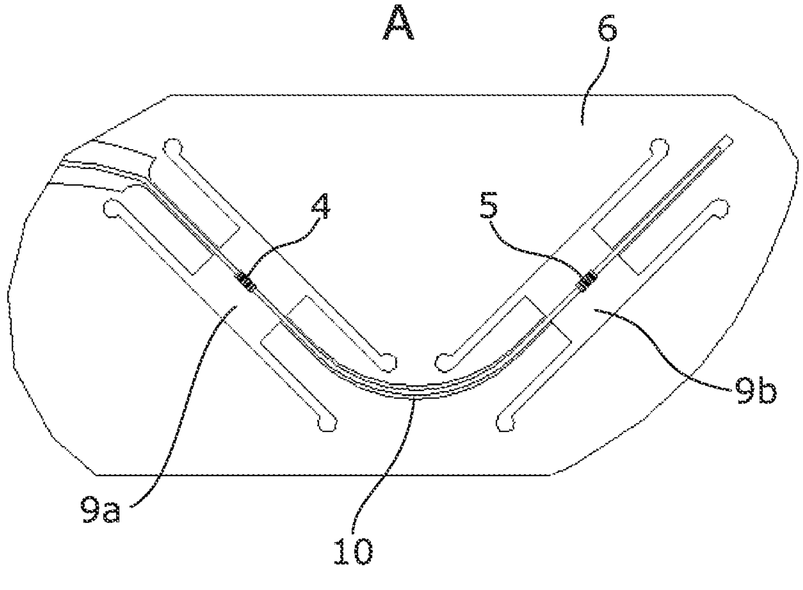
FIG. 3*b* shows an enlarged detail of area A of FIG. 3*a*.

A third embodiment of the inventive fiber optic sensor unit 1*c* is shown in FIG. 3. In the third embodiment, the FBGs are arranged in a V-geometry. FIG. 3 shows an embodiment where both FBGs, 4, 5 are inscribed in the same sensor fiber 10. Nevertheless, FBGs 4, 5 can also be inscribed in different sensor fibers 2, 3 (not shown). The sensor fibers 2, 3 are attached to the sensor plate 6. The sensor plate 6 has a groove 11 in which the sensor fibers 10 runs. The sensor plate has a gap 9*a*, 9*b*. The sensor fibers 10 span the gaps 9*a*, 9*b* such that the FBGs 4, 5 from a V in the crossing area A. The crossing area A is shown in more detail in FIG. 3*b*. The sensor fiber 10 runs at one height level, thereby allowing a simple construction of the fiber optic sensor unit.

Figure 4:
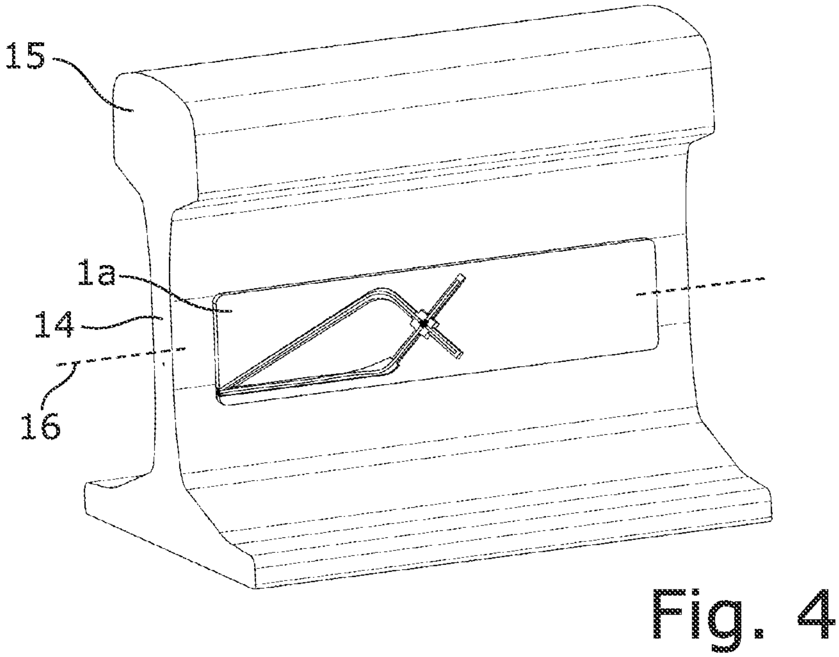
FIG. 4 shows a perspective view of the first embodiment of the inventive fiber optic sensor unit mounted at a rail.
Figure 5:
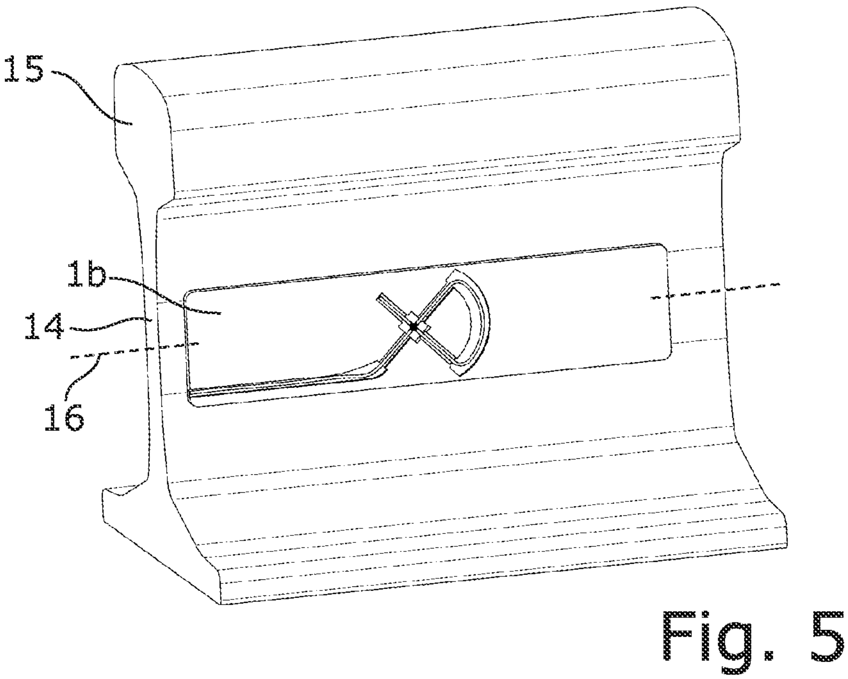
FIG. 5 shows a perspective view of the second embodiment of the inventive fiber optic sensor unit mounted at a rail.

FIGS. 4 and 5 show perspective views of the first embodiment and the second embodiment of the inventive fiber optic sensor unit 1*a*, 1*b* mounted at a rail web 14 of a rail 15. The fiber optic sensor unit is attached to the rail such that the FBGs 4, 5 are arranged symmetrically to the neutral axis 16 of the rail 15 and symmetrically to a plane which is orthogonal to the neutral axis 16.

Figure 6:
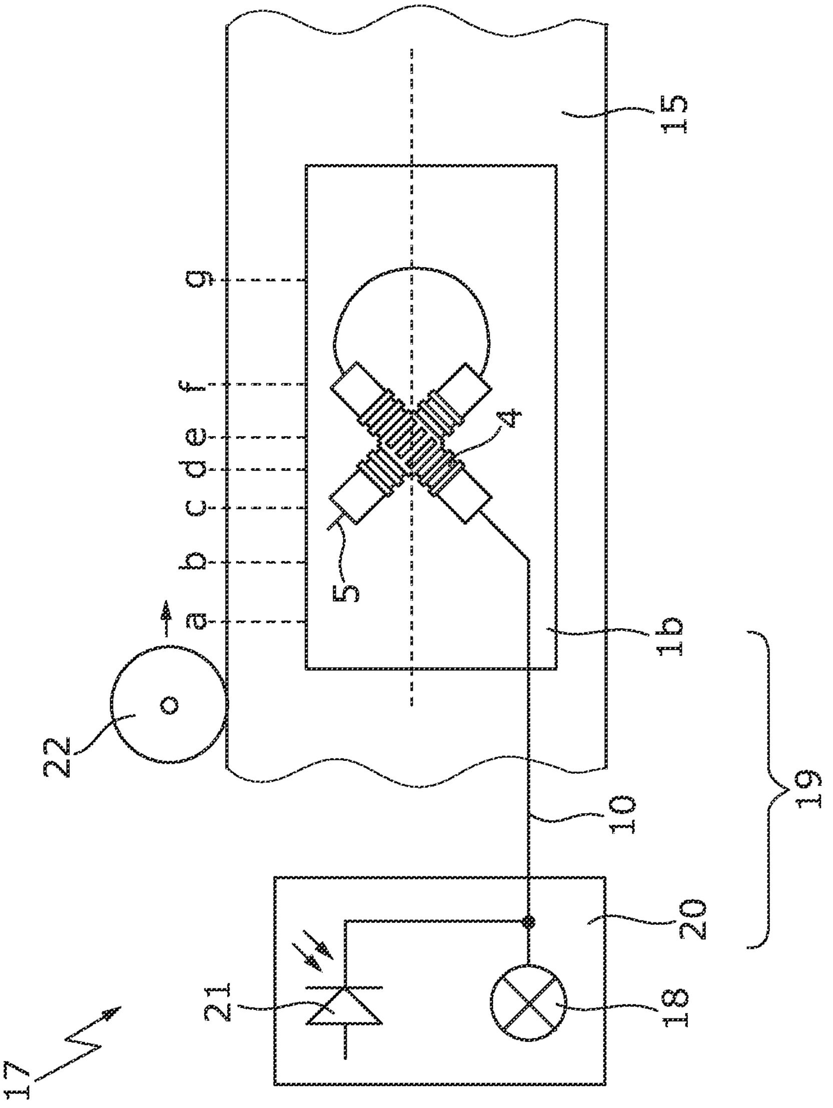
FIG. 6 shows an axle-counting device according to the invention using the second embodiment of the inventive fiber optic sensor unit for carrying out the inventive axle-counting method; different positions of a passing wheel are indicated.
Figure 7:
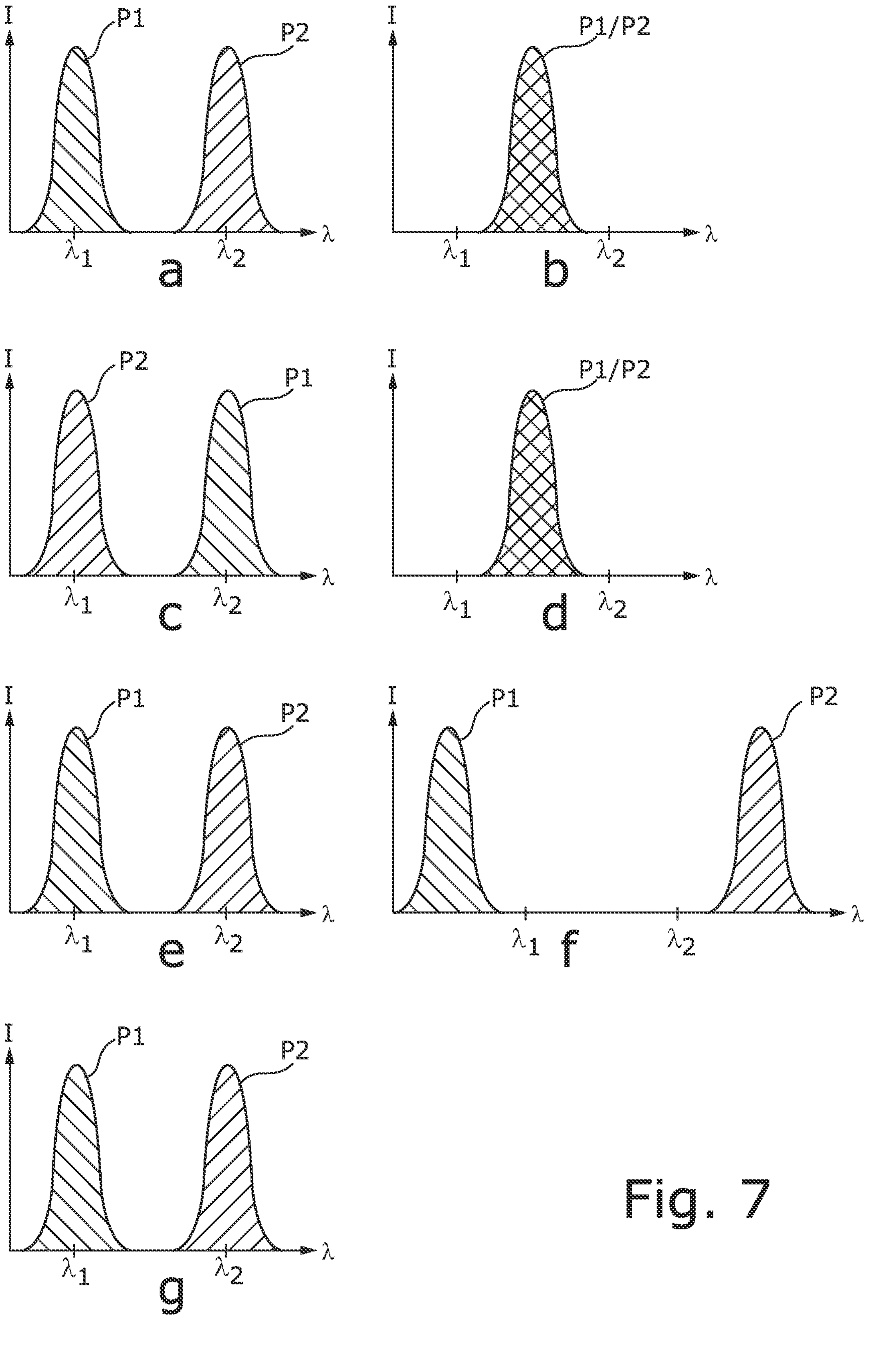
FIG. 7 shows diagrams, which indicate the intensity of the light reflected by the fiber Bragg gratings of the axle-counting device shown in FIG. 6 in dependence of the wavelength, each diagram representing the intensity at a different wheel position indicated in FIG. 6.

The inventive fiber optic sensor unit 1*a*, 1*b*, 1*c* can be used for axle counting. As an example, FIG. 6 shows an axle-counting device 17 according to the invention using the first embodiment of the inventive fiber optic sensor unit 1*b*. The axle counting device 17 comprises a light source 18, and a counting unit 19, wherein the counting unit 19 comprises fiber optic sensor unit 1*b* a signal-processing unit 20 for processing of the light coming from the fiber optic sensor unit. Light is coupled from the light source 18 into the sensor fiber 10 of the fiber optic sensor unit 1*b*. The light source 18 can be integrated in the signal-processing unit 20. The light reflected by the FBGs 4, 5 is detected by a photo diode 21 of the signal-processing unit 20. In dependence of positions a, b, c, d, e, f, g of a passing wheel 22 light of different wavelength is reflected from the FBGs. FIG. 7 shows diagrams in which reflection peaks P1, P2 of the light reflected by the two FBGs 4, 5 can be identified, each diagram representing one of the positions a, b, c, d, e, f, g indicated in FIG. 6.

At position a, the wheel 22 does not influence the FBGs 4, 5. The FBGs 4, 5 reflect light at the respective rest Bragg wavelength λ1, λ2 and the reflection peaks P1, P2 can be identified at rest Bragg wavelength λ1, λ2. Due to the inventive X arrangement of the FBGs, the wavelengths of the reflected light are shifted in opposite directions as soon as the sensor is subjected to a load. At position b both FBGs reflect light at the same wavelength—the reflection peaks overlap. The distances between the operating points (=Bragg wavelengths in the unloaded state) can be selected such, that the reflection peaks P1, P2 "overtake" each other (position of reflection peak P1 changes from left to right while position of reflection peak P2 changes from right to left, as shown in diagram for position c) when a wheel passes over the fiber optic sensor unit. As the wheel passes on the reflection peaks P1, P2 move to each other again (position d) return to their rest Bragg wavelength (position e) and pass over to lower wavelength in case of reflection peak P1 and higher wavelength in case of reflection peak P2 (position f). As the wheel stops influencing the FBGs, the reflection peaks return to their rest Bragg wavelength (position g).

Figure 8:
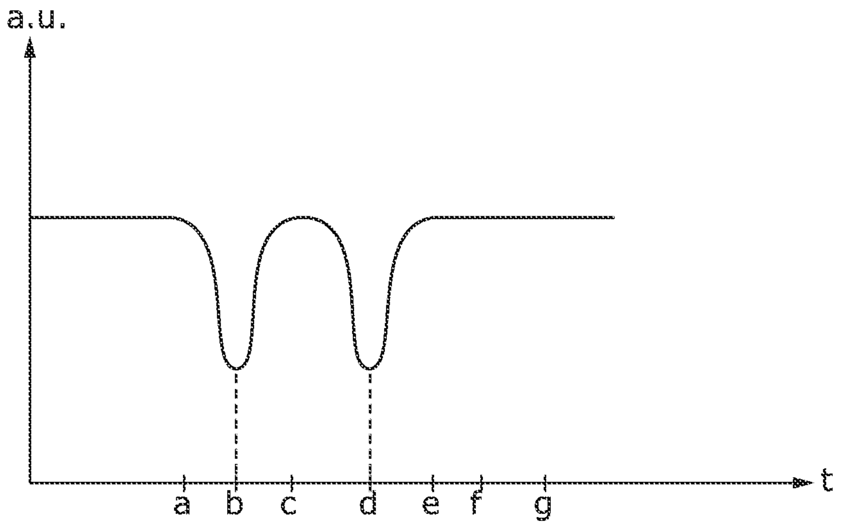
FIG. 8 shows the signal detected at the photo diode of the axle-counting device shown in FIG. 6 in dependence of time during a wheel is passing the positions indicated in FIG. 6.

The signal detected by the photo diode 21 of the axle-counting device 17 in dependence of time during the wheel 22 is passing the positions a-g is shown in FIG. 8. Two FBGs with the same half width are suggested, so that the detected light is reduced in intensity twice by the half (namely at positions b and d). I.e. each passing wheel produces two signal pulses. Please note, that these two pulses do not contain any direction information. With the width of the FBG the range can be influenced, with the distance of the wavelengths of the FBG the sensitivity of the sensor can be influenced. The signal pulses can be evaluated without an optical chip but directly by the photodiode 21. The conversion of the wavelength change into light intensities thus takes place in the fiber optic sensor unit 1*b* itself, which enables reducing the optical signal processing to a minimum (one photodiode 21) and keeps the electrical evaluation simple.

Figure 9:
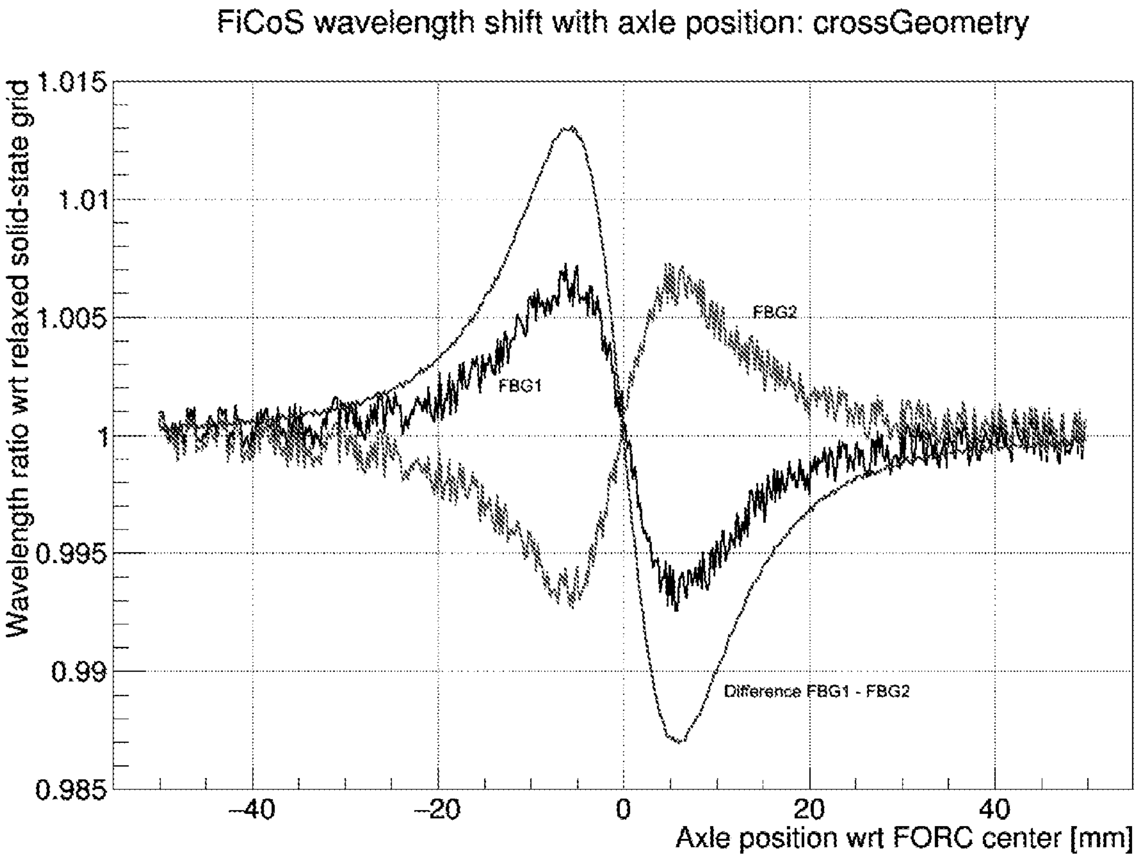
FIG. 9 shows diagram, which indicates the wavelength shift in dependence of the position of a passing axle with respect to a fiber optic sensor unit according to the invention.

As shown in FIG. 9, the reflection peaks generated by the two FBGs due to the passing wheel move in opposite direction, whereas interfering signals, e.g. due to the bending and vibrations of the rails or temperature move in the same direction in case of both FBGs. The reason for this is the following: The wheel 22 compresses and bends the rail 15 as it passes but more importantly, it causes a localized shear strain in the rail 15. The shear strain is a result of a rail segment stretching in one direction whilst compressing in the orthogonal. The bending and vibration caused by the passing wheels (disturbances causing interfering signals) affects a large segment of the rail resulting in preceding or following wheels affecting the strains in the rail under the wheel being measured (nearly independent if the position of the wheel relative to the fiber optic sensor unit). The shear strain, however, is different in that it is localized and so only results from the wheel above the fiber optic sensor unit.

According to the invention, a pair of fiber optic strain sensors is attached to the rail at 45 degrees and orthogonal to each other. In the shown embodiment, both fiber optic strain sensors are located at the same longitudinal location of the rail, thereby forming an X-geometry. Thus, they will experience exactly the same vertical and horizontal strains but opposite components of the shear strain which are equal in amount. The difference between the signals detected by the two FBGs is therefore a direct measure of the shear strain without any of the distorting strains in the rail. An according diagram is shown in figure. The invention allows to reduce the size of the sensor and to measure directly the desired shear strain in the rail without requiring complex post processing.

LIST OF CITED REFERENCES

[01] EP 3 069 952 B1
[02] DE 10 2014 100 653 B4
[03] OMEGA: Positioning strain Gages to monitor bending, axial, shear, and torsional loads, https://www.omega.com/faq/pressure/pdf/positioning.pdf

LIST OF REFERENCE SIGNS

1*a*, 1*b*, 1*c* fiber optic sensor units
2, 3 sensor fibers with one inscribed FBG
4, 5 FBGs
6 sensor plate
7, 8 grooves in the sensor plate at different height-levels
9 gap of the sensor plate
10 sensor fiber with two inscribed FBGs
11 groove in the sensor plate with varying height-level
12, 13 grooves in the sensor plate at the same height-level
14 rail web of the rail
15 rail
16 neutral axis of the rail
17 axle counting device
18 light source
19 counting unit
20 signal-processing unit
21 photo diode
22 wheel
a-g positions of the wheel along the rail relative to the fiber optic sensor unit
P1 light peak of light reflected by the first FBG
P2 light peak of light reflected by the second FBG

What is claimed is:

1. A fiber optic sensor unit for detecting a mechanical force acting on a rail, comprising:

at least one first sensor fiber;

a first elongated fiber optic strain sensor and a second elongated fiber optic strain sensor, wherein the at least one first sensor fiber comprises the first elongated fiber optic strain sensor, wherein the first and second elongated fiber optic strain sensors are fiber Bragg gratings, wherein either both fiber Bragg gratings are inscribed in one sensor fiber or each of the fiber Bragg gratings is inscribed in a separate sensor fiber;

wherein the at least one sensor fiber on both ends adjacent the first and the second elongated fiber optic strain sensors are attached to a single common sensor plate;

wherein the first elongated fiber optic strain sensor and the second elongated fiber optic strain sensor are arranged in an x-type geometry, wherein the first elongated fiber optic strain sensor and the second elongated fiber optic strain sensor are arranged in an angle of 60° to 120° to each other; and wherein the sensor plate comprises a recess, wherein the at least one fiber spans the recess where the first and second elongated fiber optic strain sensors are positioned freely within the recess without contact to the sensor plate.

2. The fiber optic sensor unit according to claim 1, wherein the first strain sensor and the second strain sensor have different Bragg wavelengths, and wherein the strain sensors are at a distance to each other in a direction perpendicular to the longitudinal extensions of the strain sensors.

3. The fiber optic sensor unit according to claim 1, wherein the sensor plate comprises at least one groove in which the at least one sensor fiber is attached.

4. The fiber optic sensor unit according to claim 3, wherein the at least one groove is etched.

5. The fiber optic sensor unit according to claim 4, wherein the at least one groove comprises two grooves being a first groove and a second groove, wherein the first groove and the second groove are part of the same sensor plate, wherein the two grooves are at different height levels of the sensor plate.

6. The fiber optic sensor unit according to claim 5, wherein the at least one first sensor fiber comprises both the first fiber Bragg grating as well as the second fiber Bragg grating.

7. The fiber optic sensor unit according to claim 5, wherein the at least one first sensor fiber comprises two sensor fibers, each fiber Bragg grating being part of a separate sensor fiber.

8. The fiber optic sensor unit according to claim 1, wherein the sensor plate is attached to a base plate for mounting the fiber optic sensor on the rail, wherein the base plate has a continuous bottom plane.

9. The fiber optic sensor unit according to claim 1, wherein the sensor plate includes a mechanical amplifier, which transfers and multiplies the alternation of length from the rail to the fiber Bragg grating.

10. The fiber optic sensor unit according to claim 1, wherein the first elongated fiber optic strain sensor and the second elongated fiber optic strain sensor are arranged in an angle of 90° to each other.

11. An optical measuring system for measuring shear stress of a rail, the system comprising:

the rail having a longitudinal extension and a neutral axis, which extends along the longitudinal extension;

the fiber optic sensor unit according to claim 1 for detecting optical signals in dependence of the shear strain acting on the rail;

wherein the fiber optic sensor unit is mounted at the rail such that the fiber Bragg gratings are oriented obliquely with respect to the neutral axis;

a light source which is adapted for coupling light into the sensor fibers of the fiber optic sensor unit; and a signal-processing unit for processing signals detected by the fiber optic sensor unit, wherein the signal-processing unit comprises a photo diode.

12. The optical measuring system according to claim 11, wherein the signal processing unit comprises an edge filter with a falling edge and a raising edge, and that the first fiber Bragg grating has a Bragg wavelength at the raising edge and the second fiber Bragg grating has a Bragg wavelength at the falling edge of the edge filter.

13. The optical measuring system according to claim 12, wherein the strain sensors are arranged symmetrically to a plane comprising the neutral axis of the rail.

14. The optical measuring system according to claim 13, wherein the strain sensors are arranged symmetrically to a plane perpendicular to the neutral axis of the rail.

15. An axle-counting device comprising at least one light source and at least one counting unit, wherein each counting unit comprises at least one fiber optic sensor unit according to claim 1, the at least one fiber optic sensor unit being adapted for mounting to a rail, and a signal-processing unit comprising a photo diode, wherein the light source is adapted for coupling light into the sensor fibers of the fiber optic sensor unit.

16. An axle-counting method for rail bound vehicles, comprising the following method steps:

a) coupling, via at least one sensor fiber, light into a first and a second fiber optic strain sensor being fiber Bragg gratings of a fiber optic sensor unit which is attached to a rail;

b) detecting light reflected by the first and the second fiber optic strain sensor by a photo diode, as a result of which a shear stress signal of the rail is received in each case, wherein each fiber optic strain sensor has a reflection spectrum having a reflection peak which is at a Bragg wavelength and has a full width at half maximum;

c) generating a shear stress difference signal from the two received shear stress signals;

d) generating a wheel signal within a signal-processing unit if the shear stress difference signal exceeds a predetermined upper limiting value or falls below a predetermined lower limiting value;

wherein the fiber optic strain sensors which are used are arranged in an x-type geometry, wherein the first strain sensor and the second strain sensor are arranged in an angle of 60° to 120° to each other, wherein either both fiber Bragg gratings are inscribed in one sensor fiber or each of the fiber Bragg gratings is inscribed in a separate sensor fiber, wherein a single sensor plate comprises a recess, wherein the at least one fiber spans the recess such that the strain sensors are positioned freely within the recess without contact to the sensor plate; and wherein the full width at half maximum of the reflection peak of the first fiber optic strain sensor and the full width at half maximum of the reflection peak of the second fiber optic strain sensor deviate in their respective full width at half maximums from each other by a maximum of 200%.

17. The axle-counting method according to claim 16, wherein the sensor fiber which is used comprises both, the first and the second fiber optic strain sensors, the first and the second fiber optic strain sensors being arranged in a row and having different Bragg wavelengths, and that the shear stress difference signal is generated optically by a spectral overlap of the reflection peaks of the two fiber optic strain sensors during the transition from an unloaded state to a loaded state.

18. The axle-counting method according to claim 17, wherein method steps a) to d) are carried out with a further fiber optic sensor unit which is attached to another rail of the track wherein the two fiber optic sensor units are spaced apart from one another in the rail direction.

19. The axle-counting method according to claim 16, wherein the first strain sensor and the second strain sensor are arranged in an angle of 90° to each other.

20. The axle-counting method according to claim 16, wherein the step of detecting light reflected by the first and the second fiber optic strain sensor by the photo diode is evaluated without an optical chip.

* * * * *